US012735038B2

(12) United States Patent
Karimi et al.

(10) Patent No.: US 12,735,038 B2
(45) Date of Patent: Sep. 15, 2026

(54) HEURISTIC MULTI-CORNER PERFORMANCE MONITORING OF BRAKE ACTUATOR OUTPUT FOR DECENTRALIZED VEHICLE BRAKE SYSTEMS

(71) Applicant: GM GLOBAL TECHNOLOGY OPERATIONS LLC, Detroit, MI (US)

(72) Inventors: Mohammad Karimi, Pickering (CA); Matthew Weaver, Fenton, MI (US); Ryan Loveland, Rochester, MI (US); Tasneem R. Huq, Courtice (CA); Joshua Lo, Whitby (CA); Edward T. Heil, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 36 days.

(21) Appl. No.: 18/782,654

(22) Filed: Jul. 24, 2024

(65) Prior Publication Data

US 2026/0028025 A1 Jan. 29, 2026

(51) Int. Cl.

*B60T 8/88* (2006.01)
*B60W 10/10* (2012.01)

(Continued)

(52) U.S. Cl.

CPC ...... *B60W 30/18109* (2013.01); *B60W 10/10* (2013.01); *B60W 10/184* (2013.01);

(Continued)

(58) Field of Classification Search

CPC .......... B60W 30/18109; B60W 10/10; B60W 10/184; B60W 10/20; B60W 2510/12;

(Continued)

(56) References Cited

U.S. PATENT DOCUMENTS

| | | | |
|---|---|---|---|
| 7,266,438 | B2 | 9/2007 | Kellum |
| 7,589,643 | B2 | 9/2009 | Dagel |

(Continued)

FOREIGN PATENT DOCUMENTS

| | | | |
|---|---|---|---|
| DE | 10015225 | A1 | 4/2001 |
| DE | 102017116196 | A1 | 1/2018 |

*Primary Examiner* — Gonzalo Laguarda

(74) *Attorney, Agent, or Firm* — Quinn IP Law

(57) ABSTRACT

A method of operating a vehicle includes receiving brake sensor data indicative of measured actuator outputs of a decentralized brake system's brake actuators. For each brake actuator, a vehicle controller calculates: a normalized corner output using the measured actuator output and a commanded target output for that brake actuator, and a weighted average using the normalized corner output of that brake actuator and a vehicle-calibrated weight value determined from the vehicle's current speed and steering angle. The controller calculates an actuator error percentage as an absolute value of a mathematical difference between the weighted averages of the brake actuators, and detects an actuator fault when the actuator error percentage exceeds a vehicle-calibrated fault deviation threshold determined from the vehicle's current speed and steering angle. Responsive to the error percentage exceeding the fault deviation threshold, the controller commands the brake system to execute a brake action to remediate the actuator fault.

20 Claims, 5 Drawing Sheets

(51) Int. Cl.
*B60W 10/184* (2012.01)
*B60W 10/20* (2006.01)
*B60W 30/18* (2012.01)

(52) U.S. Cl.
CPC ......... *B60W 10/20* (2013.01); *B60W 2510/12* (2013.01); *B60W 2510/182* (2013.01); *B60W 2510/20* (2013.01); *B60W 2520/06* (2013.01); *B60W 2520/10* (2013.01); *B60W 2530/10* (2013.01); *B60W 2540/12* (2013.01)

(58) Field of Classification Search
CPC ....... B60W 2510/182; B60W 2510/20; B60W 2520/06
See application file for complete search history.

(56) References Cited

U.S. PATENT DOCUMENTS

| | | | | |
|---|---|---|---|---|
| 7,739,036 | B2 | 6/2010 | Grimm | |
| 8,132,867 | B2 * | 3/2012 | Sawada | B60T 8/885 303/122 |
| 8,384,532 | B2 | 2/2013 | Szczerba | |
| 9,099,006 | B2 | 8/2015 | Mudalige | |
| 10,204,461 | B2 * | 2/2019 | Chen | B60W 50/0205 |
| 10,227,021 | B2 | 3/2019 | Lor | |
| 11,752,881 | B2 | 9/2023 | Otanez | |
| 2012/0101713 | A1 | 4/2012 | Moshchuk | |
| 2013/0054128 | A1 | 2/2013 | Moshchuk | |
| 2013/0219294 | A1 | 8/2013 | Goldman-Shenhar | |
| 2015/0266383 | A1 | 9/2015 | Kidston | |
| 2017/0021830 | A1 | 1/2017 | Feldman | |
| 2024/0317195 | A1 * | 9/2024 | Pagni | B60T 8/171 |

* cited by examiner

NORMALIZATION

WEIGHTED SIDES AND AXLES AVERAGING

FAILURE DETECTION

HEURISTIC MULTI-CORNER PERFORMANCE MONITORING OF BRAKE ACTUATOR OUTPUT FOR DECENTRALIZED VEHICLE BRAKE SYSTEMS

INTRODUCTION

The present disclosure relates generally to brake systems for motor vehicles. More specifically, aspects of this disclosure relate to automobiles with adaptive decentralized brake systems.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

Automobiles are typically equipped with a hydraulic, pneumatic, or electromechanical brake system that is activated by the vehicle driver or on-board vehicle controller to selectively slow and ultimately stop the vehicle during day-to-day use. The most common type of brake system used by modern-day passenger vehicles is a friction brake system in which a hydraulically actuated piston drives a brake pad or shoe ("friction brake element") into frictional engagement with a rotating caliper or drum ("rotating brake element"). In so doing, the friction brake system converts kinetic energy of the vehicle into heat energy of the frictionally engaged rotating and frictional brake elements in order to slow/stop rotation of a corresponding wheel unit. Some automobiles now employ a decentralized ("brake-by-wire") vehicle brake system in which an individual motor-driven actuator is incorporated into each wheel corner assembly and a central brake control module individually activates the actuators to provide a desired braking force at that wheel.

SUMMARY

Presented below are smart brake control systems with attendant control logic that provision corner performance monitoring of brake actuator output for decentralized vehicle brake systems, methods for manufacturing and methods for operating such brake control systems, and motor vehicles equipped with such brake control systems. In a representative example, a smart brake control system and method is presented for heuristically detecting systemic failures in a decentralized brake-by-wire (BBW) system before an undesirable longitudinal or lateral vehicle event occurs. Brake system failure detection may be achieved by comparing deviations between detected brake actuator responses and commanded target actuator outputs from higher level controls across each brake actuator. Upon detection of a failure, the system and method may responsively identify and initiate an appropriate remediation of the failure within the brake system to maintain proper brake distribution and, thus, stable vehicle operation.

Using closed-loop feedback control, the vehicle brake control system may provide a reliable detection mechanism against a degraded decentralized brake actuator that is not providing controller-commanded braking torque. To identify an actuator exhibiting "bad behavior," the system may monitor each individual brake corner to assess its impact on longitudinal and lateral dynamic behaviors during a brake event. This detection mechanism may help to enable identification of the actuator or actuators causing the largest impact on a potentially hazardous driving scenario. To help maximize coverage, the faulty brake actuator detection mechanism may be designed to consume unitless, normalized corner actuator outputs. In so doing, the brake corner monitor may remain active during heterogeneous braking events, including anti-lock brake system (ABS) activity, electronic stability control (ESC) actuation, adaptive cruise control (ACC) operation, etc., in which commanded target forces or pressures may be different between each corner actuator. Disclosed corner performance monitoring methodologies may be applied to any four-wheeled vehicle using decentralized brake-by-wire actuators, including those employing a mix of electro-mechanical and electro-hydraulic brake actuators, as well as vehicles that utilize regenerative braking and those that offer autonomous vehicle (AV) and advance driver assistance system (ADAS) braking maneuvers.

Aspects of this disclosure are directed to smart brake control systems, memory-stored vehicle control protocols, and vehicle control logic for provisioning corner performance monitoring of brake actuator output for decentralized vehicle brake systems. In an example, a method is presented for operating a motor vehicle, which has a vehicle body, multiple road wheels attached to the vehicle body, and a decentralized brake system with multiple brake actuators each operable to decelerate one of the road wheels. This representative method includes, in any order and in any combination with any of the above and below disclosed options and features: receiving, e.g., via a resident or remote microcontroller, control module, programmable logic device, or network of controllers/modules/devices (collectively "controller") from multiple brake torque sensors operatively attached to the brake actuators, sensor data indicative of measured actuator outputs of the brake actuators; calculating, e.g., via the vehicle controller for each brake actuator, a normalized corner output using the measured actuator output and a commanded target output for that brake actuator; calculating, e.g., via the vehicle controller for each brake actuator to calculate an overall system average, left/right lateral averages, and/or front/rear longitudinal averages, a weighted average using the normalized corner output of that brake actuator and a vehicle-calibrated weight value retrieved from a memory-stored lookup table based on the vehicle's current speed and/or current steering angle; calculating, e.g., via the vehicle controller, an actuator (lateral, longitudinal, total system) error percentage as an absolute value of a mathematical difference between the weighted averages of the brake actuators; detecting, e.g., via the vehicle controller, an actuator fault when the actuator error percentage exceeds a vehicle-calibrated fault deviation threshold retrieved from a memory-stored lookup table based on the vehicle's current speed and/or steering angle; and commanding, e.g., via the vehicle controller responsive to determining the actuator error percentage exceeds the vehicle-calibrated fault deviation threshold, the decentralized brake system, the vehicle steering system, and/or the vehicle powertrain to execute a vehicle-calibrated action to offset or otherwise remediate the actuator fault.

Aspects of this disclosure are also directed to computer-readable media (CRM) containing controller-executable instructions for monitoring and adapting brake actuator output for decentralized vehicle brake systems. In an example, a non-transient CRM stores instructions that are executable by one or more processors of a vehicle controller of a motor vehicle. The motor vehicle includes multiple road wheels and a decentralized brake system with multiple brake actuators each operable to decelerate a respective one of the road wheels. The CRM-stored instructions, when executed by the processor(s), cause the vehicle controller to perform operations, including: receiving, from each of multiple sensors operatively attached to the brake actuators, sensor data indicative of a measured actuator output of a respective one of the brake actuators; calculating, for each of the brake actuators, a normalized corner output using the measured actuator output and a respective commanded target actuator output for the brake actuator; determining a vehicle-calibrated weight value from a current vehicle speed and/or a current vehicle steering angle; calculating, for each of the brake actuators, a weighted average using the normalized corner output of the brake actuator and the vehicle-calibrated weight value; calculating an actuator error percentage as an absolute value of a mathematical difference between the weighted averages of the brake actuators; determining a vehicle-calibrated fault deviation threshold from the current vehicle speed and/or the current vehicle steering angle; detecting an actuator fault when the actuator error percentage is greater than the vehicle-calibrated fault deviation threshold; and commanding, responsive to determining the actuator error percentage is greater than the vehicle-calibrated fault deviation threshold, the decentralized brake system to execute a vehicle-calibrated brake action to remediate the actuator fault.

Additional aspects of this disclosure are directed to motor vehicles equipped with decentralized brake systems and heuristic corner performance monitoring and feedback systems. As used herein, the terms "vehicle" and "motor vehicle" may be used interchangeably and synonymously to include any relevant vehicle platform, such as passenger vehicles, commercial vehicles, industrial vehicles, off-road and all-terrain vehicles (ATV), motorcycles, farm equipment, aircraft, spacecraft, etc. In an example, a motor vehicle includes a vehicle body with a passenger compartment, multiple road wheels mounted to the vehicle body (e.g., via corner modules coupled to a unibody or body-on-frame chassis), and other standard original equipment. A prime mover, which may be in the nature of a traction motor and/or internal combustion engine assembly, is located inside the vehicle body and drives the road wheel(s) to propel the vehicle. Also attached to the vehicle body is a decentralized brake system with multiple independently operable brake actuators for decelerating the road wheels to thereby slow and/or stop the motor vehicle. A brake sensor (e.g., corner brake actuator force, pressure, or current sensor) is operatively attached to each brake actuator and operable to actively monitor, in real time, the braking torque output by that actuator.

Continuing with the discussion of the foregoing example, the vehicle is also equipped with a resident or remote vehicle controller that is programmed to communicate with each brake sensor to receive therefrom sensor data indicative of a measured actuator output of a respective brake actuator. Using the measured actuator output and a respective commanded target output for that brake actuator, the vehicle controller calculates a normalized corner output for each brake actuator. The vehicle controller then determines a vehicle-calibrated weight value based on the vehicle's current speed and/or steering angle, and concomitantly calculates a weighted average for each brake actuator (e.g., to calculate overall system average, left/right lateral averages, and/or front/rear longitudinal averages) using the normalized corner output of the brake actuator and the vehicle-calibrated weight value. The vehicle controller thereafter calculates an actuator (lateral, longitudinal, total system) error percentage as an absolute value of a mathematical difference between the weighted averages of the brake actuators, and determines a vehicle-calibrated fault deviation threshold, e.g., based on the vehicle's current speed and/or steering angle. If the actuator error percentage exceeds the fault deviation threshold, the controller flags one or more actuator faults and responsively commands the decentralized brake system, the vehicle steering system, and/or the vehicle powertrain system to execute a vehicle-calibrated action to remediate the actuator fault(s).

For any of the disclosed vehicles, methods, and CRM, the vehicle's decentralized brake system may include front-left (FL), front-right (FR), rear-left (RL), and rear-right (RR) brake actuators for braking respective FL, FR, RL, and RR road wheels. In this instance, calculating a normalized corner output may include calculating respective FL, FR, RL and RR normalized corner outputs for the FL, FR, RL and RR brake actuators. As a further option, the sensor data received from the vehicle's brake sensors may include a force feedback value and a pressure feedback value for each brake actuator. In this instance, calculating the normalized corner output may also include receiving a target force value and a target pressure value for each brake actuator. Calculating the normalized corner outputs may include identifying an actuator type for each brake actuator (e.g., electro-hydraulic vs. electro-mechanical), and merging the force feedback value and the pressure feedback value (e.g., disregarding null information) based on the actuator type for that brake actuator to derive a merged feedback value for each brake actuator.

For any of the disclosed vehicles, methods, and CRM, calculating a weighted average may include calculating a right-side weighted average for the FR and RR brake actuators based on the FR and RR normalized corner outputs, and calculating a left-side weighted average for the FL and RL brake actuators based on the FL and RL normalized corner outputs. In this instance, the actuator error percentage may include a lateral error percentage that is calculated as the absolute value of the mathematical difference between the right-side weighted average and the left-side weighted average. An actuator fault may be detected and flagged when the lateral error percentage exceeds a vehicle-calibrated lateral deviation threshold. As another option, calculating a weighted average may include calculating a front-side weighted average for the FR and FL brake actuators based on the FR and FL normalized corner outputs, and calculating a rear-side weighted average for the RR and RL brake actuators based on the RR and RL normalized corner outputs. In this instance, the actuator error percentage may include a longitudinal error percentage that is calculated as the absolute value of the mathematical difference between the front-side weighted average and the rear-side weighted average. An actuator fault may be detected and flagged when the longitudinal error percentage exceeds a vehicle-calibrated longitudinal deviation threshold.

For any of the disclosed vehicles, methods, and CRM, calculating a weighted average may include calculating a full-system average for all of the FL, FR, RL and RR brake actuators based on all of the FL, FR, RL and RR normalized corner outputs. In this instance, the actuator error percentage includes a system error percentage calculated as the absolute value of the mathematical difference between the full-system average and a target full-system average. An actuator fault may be detected and flagged when the system error percentage exceeds a vehicle-calibrated overall deviation threshold.

For any of the disclosed vehicles, methods, and CRM, the vehicle controller may respond to detecting an actuator fault by determining which of the brake actuators is a worst offending actuator (e.g., highest measured degradation) based on the calculated normalized corner outputs and the calculated weighted averages. As a further option, the vehicle controller may actively receive/retrieve the weight value from a memory-stored calibration lookup table, and may receive/retrieve the fault deviation threshold from the same or a different memory-stored calibration lookup table. In this instance, the vehicle controller may update a weight and threshold data set to include the received/retrieved vehicle-calibrated weight value and vehicle-calibrated fault deviation threshold. The vehicle controller may also actively receive/retrieve current vehicle speed data, current vehicle steering angle data, and commanded target actuator output data. In this instance, the controller may update a signal data set within a defined time domain to include the current vehicle speed, the current vehicle steering angle, the commanded target actuator outputs, and the measured actuator outputs.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
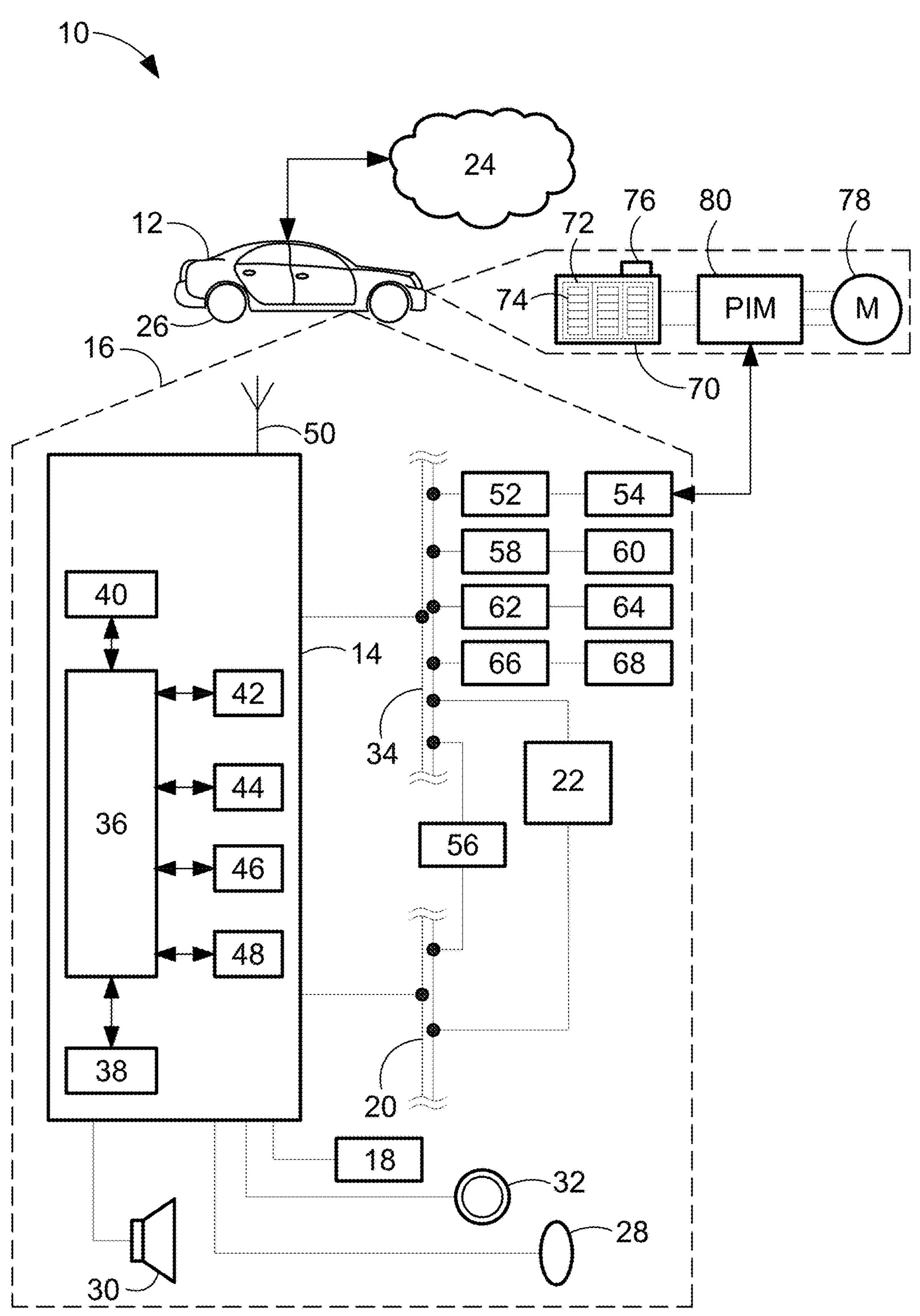
FIG. 1 is a partially schematic, side-view illustration of a representative motor vehicle with a decentralized brake system and a network of on-vehicle controllers, sensor devices, and communication devices for provisioning corner performance monitoring of brake actuator output in accordance with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Brief Description of the Drawings, and Detailed Description sections, but not explicitly set forth in the claims, should not be incorporated into the claims, singly or collectively, by implication, inference or otherwise. Moreover, recitation of "first", "second", "third", etc., in the specification or claims is not per se used to establish a serial or numerical limitation; unless specifically stated otherwise, these designations may be used for ease of reference to similar features in the specification and drawings and to demarcate between similar elements in the claims.

For purposes of this disclosure, unless specifically disclaimed: the singular includes the plural and vice versa (e.g., indefinite articles "a" and "an" should generally be construed as meaning "one or more"); the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which aspects of this disclosure may be practiced. In the same vein, execution of the present concepts for the illustrated vehicle brake system should be appreciated as a non-limiting implementation of disclosed features. As such, it will be understood that aspects and features of this disclosure may be implemented for other vehicle brake system architectures and may be incorporated into any logically relevant type of motor vehicle. Moreover, only select components of the motor vehicle and vehicle brake system are shown and described in detail herein. Nevertheless, the vehicles and systems discussed below may include numerous additional and alternative features, and other available peripheral hardware, for carrying out the various methods and functions of this disclosure.

The representative vehicle 10 of FIG. 1 is originally equipped with a vehicle telecommunications and information ("telematics") unit 14 that wirelessly communicates, e.g., via cellular network, satellite service, wireless-enabled modem, etc., with a remotely located cloud computing host service 24 (e.g., ONSTAR®). Some of the other vehicle hardware components 16 shown generally in FIG. 1 include, as non-limiting examples, an electronic video display device 18, a microphone 28, audio speaker(s) 30, and assorted user input controls 32 (e.g., buttons, knobs, pedals, switches, touchpads, touchscreens, etc.). These hardware components 16 function, in part, as a human/machine interface (HMI) that enables a user to communicate with the telematics unit 14 and other components resident to and remote from the vehicle 10. Microphone 28, for instance, provides occupants with a means to input verbal commands; the vehicle 10 may be equipped with an embedded voice-processing unit utilizing audio filtering, editing, and analysis modules. Conversely, the speaker 30 provides audible output to a vehicle occupant and may be either a stand-alone speaker dedicated for the telematics unit 14 or may be part of an audio system 22. The audio system 22 is connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. The network connection interface 34 enables the vehicle hardware 16 to send and receive signals with one another and with various systems both onboard and off-board the vehicle body 12. This allows the vehicle 10 to perform assorted vehicle functions, such as modulating powertrain output, activating friction and regenerative brake systems, controlling vehicle steering, and other automated functions. For instance, telematics unit 14 may exchange signals with a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle ECUs, such as a transmission control module (TCM), engine control module (ECM), Sensor System Interface Module (SSIM), etc.

With continuing reference to FIG. 1, telematics unit 14 is an onboard computing device that provides a mixture of services, both individually and through its communication with other networked devices. This telematics unit 14 may be generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, a solid-state drive (SSD) memory, a hard-disk drive (HDD) memory, flash memory, semiconductor memory (e.g., various types of RAM or ROM), etc.

Long-range communication (LRC) capabilities with remote, off-board devices may be provided via one or more or all of a cellular chipset/component, a navigation and location chipset/component (e.g., global positioning system (GPS) transceiver), or a wireless modem, all of which are collectively represented at 44. Close-range wireless connectivity may be provided via a short-range communication (SRC) device 46 (e.g., a BLUETOOTH® unit or near field communications (NFC) transceiver), a dedicated short-range communications (DSRC) component 48, and/or a dual antenna 50. The communications devices described above may provision data exchanges as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), Vehicle-to-Device (V2D), Vehicle-to-Cloud (V2C), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, for executing a controller-automated (AV/ADAS) driving operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The vehicle speed sensor(s) 66 may be in the nature of a mechanical or electromagnetic transmission shaft sensor or electronic wheel speed sensor for detecting vehicle speed. The vehicle dynamics sensor(s) 68 may be in the nature of a single-axis or a triple-axis accelerometer, an angular rate sensor, an inclinometer, steering wheel angle sensor, brake sensor, etc., for detecting longitudinal and lateral acceleration, yaw, roll, and/or pitch rates, steering angle, and other dynamics related parameters. The type, placement, number, and interoperability of the distributed array of in-vehicle sensors may be adapted, singly or collectively, to a given vehicle platform for achieving a desired level of automated vehicle operation.

To propel the motor vehicle 10, an electrified powertrain is operable to generate and deliver tractive torque to one or more of the vehicle's drive wheels 26. The powertrain is represented in FIG. 1 by a rechargeable energy storage system (RESS), which may be in the nature of a chassis-mounted traction battery pack 70, that is operatively connected to an electric traction motor (M) 78. The traction battery pack 70 is generally composed of one or more battery modules 72 each containing a cluster of battery cells 74, such as lithium-class, zinc-class, nickel-class, or organosilicon-class cells of the pouch, can, or cylindrical type. One or more electric machines, such as traction motor/generator (M) units 78, draw electrical power from and, optionally, deliver electrical power to the battery pack 70. A power inverter module (PIM) 80 electrically connects the battery pack 70 to the motor(s) 78 and modulates the transfer of electrical current therebetween. The battery pack 70 may include an integrated electronics package, such as a wireless-enabled cell monitoring unit (CMU) 76, that enables on-module management, cell sensing, etc.

The motor vehicle 10 may be originally equipped with a decentralized "brake-by-wire" brake system 82 that employs a central system controller (e.g., BSCM 60) for receiving and processing a braking request from a vehicle operator (e.g., driver or AV/ADAS control module), and discrete corner control modules for modulating an applied braking force at the individual vehicle wheels. As with any on-vehicle system, routine and continual use of the decentralized brake system may lead to normal wear or irregular degradation of the individual brake actuators. Discussed below is a heuristic multi-corner performance monitoring methodology for assessing the impact of a degraded brake corner actuator on the dynamics of the motor vehicle during a braking event. The corner performance monitoring methodology may enable rapid system response to degraded brake actuator output, may predict undesirable yaw and deceleration behaviors caused by a degraded actuator, and may detect when the brake system exceeds predefined operating thresholds, regardless of physical hardware (e.g., electro-hydraulic, electro-pneumatic, electro-mechanical). Another potential advance may include the ability to identify the worst-offending actuator(s), which may be determined by combining the following three parts: (1) overall system balance—total braking deviation from expected output across the vehicle; (2) longitudinal balance—front to rear braking deviation from expected output; and (3) lateral balance—side to side braking deviation from expected output.

The corner performance monitoring methodology may enable the ability to assess the respective contributions of the individual corner actuators relative to the vehicle's overall braking and dynamic behavior, which is typically not possible with centralized hydraulic brake systems. Furthermore, the method may assess brake system behavior through highly dynamic events in which individual wheel slip control is active. A heuristic approach may be utilized to identify failures within individual actuators of the decentralized brake system that may contribute to unexpected or abnormal vehicle operation during brake application. Systematic corner performance monitoring may be complemented with the ability to retrieve a predefined system response or to actively derive an appropriate system response to ameliorate individual actuator degradation or failures. Disclosed corner performance monitoring protocols may be implemented as a diagnostic or detection tool for brake data insights and system development.

Figure 2:
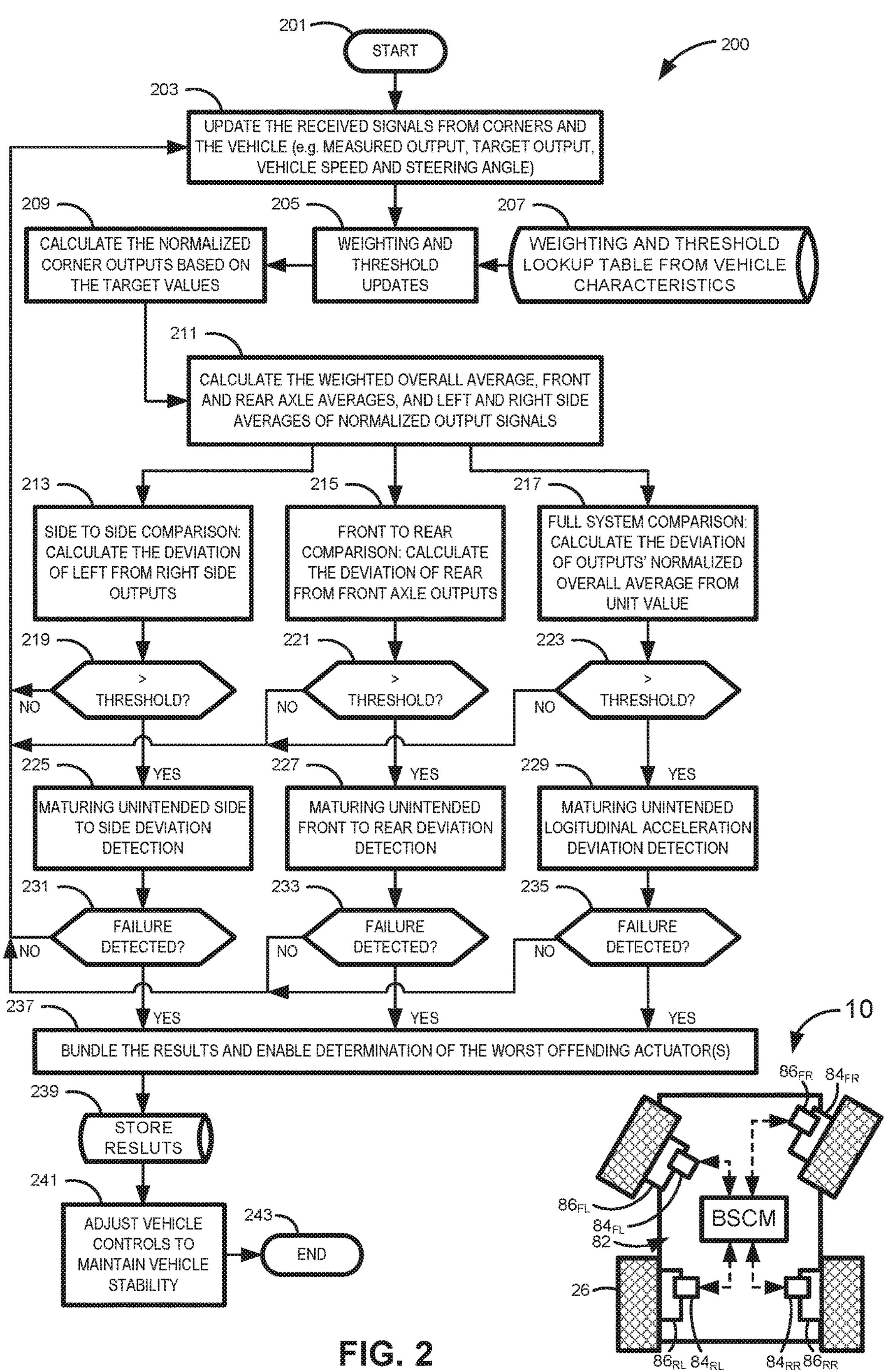
FIG. 2 is a flowchart illustrating a representative vehicle control protocol for heuristic multi-corner performance monitoring of brake actuator output for a decentralized vehicle brake system, which may correspond to memory-stored instructions that are executable by a resident or remote microcontroller, control module, logic circuit, or other integrated circuit (IC) device or network of circuits/modules/microcontrollers/IC devices (collectively "controller") in accordance with aspects of the disclosed concepts.

With reference next to the flow chart of FIG. 2, an improved method or control protocol for corner performance monitoring of brake actuator output for a vehicle brake system, such as decentralized brake system 82 of FIG. 2, of a motor vehicle, such as automobile 10 of FIG. 1, is generally described at 200 in accordance with aspects of the present disclosure. Some or all of the operations illustrated in FIG. 2 and described in further detail below may be representative of an algorithm that corresponds to non-transitory, processor-executable instructions that are stored, for example, in main or auxiliary or remote memory (e.g., resident memory device 38 and/or remote cloud computing service 24 database of FIG. 1). These instructions may be executed, for example, by an electronic controller, processing unit, dedicated control module, logic circuit, or other module or device or network of controllers/modules/devices (e.g., CPU 36, processor(s) 40, and/or BSCM 60 of FIG. 1), to perform any or all of the above and below described functions associated with the disclosed concepts. It should be recognized that the order of execution of the illustrated operation blocks may be changed, additional operation blocks may be added, and some of the herein described operations may be modified, combined, or eliminated.

Method 200 begins at START terminal block 201 of FIG. 2 with memory-stored, processor-executable instructions for initializing a closed-loop feedback control protocol for a decentralized brake system 82 of a motor vehicle 10. This routine may be initialized in real-time, near real-time, continuously, systematically, sporadically, and/or at predefined time intervals, for example, each 10 or 100 milliseconds during operation of the motor vehicle 10. As yet another option, terminal block 201 may initialize responsive to a user command prompt (e.g., via telematics 14 input controls), a resident vehicle controller prompt (e.g., from CPU 36), or a broadcast prompt signal received from a centralized back-office (BO) vehicle services system (e.g., from cloud host service 24). By way of non-limiting example, method 200 may automatically initialize in response to a driver of the motor vehicle 10 depressing an in-vehicle brake pedal or otherwise submitting a deceleration request via a suitable user input control 32. Upon completion of some or all of the control operations presented in FIG. 2, method 200 may advance to END terminal block 243 and temporarily terminate or, optionally, may loop back to terminal block 201 and run in a continuous loop.

Advancing from terminal block 201 to DYNAMICS SIGNAL UPDATE data input block 203, method 200 may execute instructions for updating signals received from the brake system's corner actuators and the vehicle's speed and dynamics sensors. This may include, for example, a resident or remote vehicle controller—the BSCM 60 individually or in collaboration with the CPU 36 and/or PCM 52—communicating with the individual front-left (FL), front-right (FR), rear-left (RL), and rear-right (RR) brake sensors $\mathbf{86}_{FL}$, $\mathbf{86}_{FR}$, $\mathbf{86}_{RL}$ and $\mathbf{86}_{RR}$ operatively attached to the individual brake actuators $\mathbf{84}_{FL}$, $\mathbf{84}_{FR}$, $\mathbf{84}_{RL}$ and $\mathbf{84}_{RR}$ of the brake system 82 to receive sensor data indicative of a measured actuator output for each brake actuator $\mathbf{84}_{FL}$, $\mathbf{84}_{FR}$, $\mathbf{84}_{RL}$, $\mathbf{84}_{RR}$. The brake sensors $\mathbf{86}_{FL}$, $\mathbf{86}_{FR}$, $\mathbf{86}_{RL}$ and $\mathbf{86}_{RR}$ may take on any suitable construct, including pressure sensors, force transducers, electrical current sensors, etc. At the same time, the vehicle controller may communicate with one or more of the vehicle speed sensors 66 and one or more of the vehicle dynamics sensors 68 to retrieve a current (real-time) vehicle speed, a current (real-time) vehicle steering angle. Lastly, the BSCM 60 may coordinate with the PCM 52 to communicate with an in-vehicle BBW brake pedal to receive an operator brake request and derive therefrom a commanded target actuator output for each brake actuators $\mathbf{84}_{FL}$, $\mathbf{84}_{FR}$, $\mathbf{84}_{RL}$, $\mathbf{84}_{RR}$. Once the new signals are collected, the vehicle controller may update a signal data set within a defined time domain to include the vehicle's current speed, current steering angle, commanded target actuator outputs, and measured actuator outputs.

Prior to, contemporaneous with, or after executing data input block 203, method 200 may execute WEIGHTING AND THRESHOLD UPDATE data input block 205 to update vehicle-calibrated weight values and vehicle-calibrated fault deviation thresholds used for subsequent weighted average calculations and actuator fault detection. It is envisioned that the vehicle-calibrated weight values and fault deviation thresholds may be derived in real-time via the vehicle controller or may be received from a back-office (BO) vehicle host server, such as cloud computing service 24 of FIG. 1. In accord with the illustrated example, however, the method 200 executes LOOKUP TABLE stored data block 207 and calls-up a weight value (first) calibration lookup table stored in read-access memory (e.g., resident memory device 38) to retrieve a vehicle-calibrated weight value. In the same vein, the vehicle controller may concurrently call-up from resident RAM memory a deviation threshold (second) calibration lookup table to retrieve a vehicle-calibrated fault deviation threshold. The deviation threshold lookup table may be part of or distinct from the aforesaid weight value lookup table. As will be explained below, the vehicle-calibrated weight value and fault deviation threshold may be selected based on the vehicle's current speed and the vehicle's current steering angle. Once retrieved, the weight value and fault deviation threshold may be saved to cache memory in a weight and threshold data set.

Method 200 of FIG. 2 may advance from data input block 205 to NORMALIZED CORNER OUTPUT subroutine 209 to calculate a set of normalized corner outputs from the sensor-measured corner outputs based on the brake system's commanded target values. As will be explained below in the discussion of FIG. 3, the vehicle controller may calculate a normalized corner output for each brake actuator $\mathbf{84}_{FL}$, $\mathbf{84}_{FR}$, $\mathbf{84}_{RL}$, $\mathbf{84}_{RR}$ using the measured actuator output provided by its brake sensor $\mathbf{86}_{FL}$, $\mathbf{86}_{FR}$, $\mathbf{86}_{RL}$ and $\mathbf{86}_{RR}$ and the respective commanded target actuator output for that brake actuator retrieved at data input block 203. After calculating the normalized corner outputs, method 200 executes WEIGHTED AVERAGE subroutine 211 to calculate a weighted overall (system) average, weighted longitudinal (front and rear axles) averages, and weighted lateral (left and right sides) averages. As will be explained below in the discussion of FIG. 4, the vehicle controller may calculate a weighted average for all and/or select pairs of the brake actuator $\mathbf{84}_{FL}$, $\mathbf{84}_{FR}$, $\mathbf{84}_{RL}$, $\mathbf{84}_{RR}$ using the normalized corner output of that brake actuator and the cache-memory stored vehicle-calibrated weight value, which is selected using the vehicle's current speed and current steering angle.

After normalizing the corner outputs and calculating the consequent weighted averages, method 200 may conduct LATERAL DEVIATION process block 213, LONGITUDINAL DEVIATION process block 215, and OVERALL SYSTEM DEVIATION process block 217 to determine side-to-side, front-to-back, and overall brake system deviations from a nominal "healthy" system. As will be discussed below in the explanation of FIG. 5, longitudinal, lateral, and overall deviations may be represented by respective actuator error percentages calculated by the vehicle controller as an absolute value of a mathematical difference between corresponding weighted averages of the brake actuators. In order to conduct a side-to-side comparison of the vehicle brake system's weighted lateral averages, for example, process block 211 may include calculating both a right-side weighted average for the FR and RR brake actuators $\mathbf{84}_{FR}$ and $\mathbf{84}_{RR}$ based on the FR and RR normalized corner outputs, and a left-side weighted average for the FL and RL brake actuators $\mathbf{84}_{FL}$, and $\mathbf{84}_{RL}$ based on the FL and RL normalized corner outputs. A lateral error percentage is concomitantly calculated at process block 213 as the absolute value of the mathematical difference between the right-side and left-side weighted averages.

In order to conduct a front-to-back comparison of the vehicle brake system's weighted lateral averages, process block 211 may include calculating both a front-side weighted average for the FR and FL brake actuators $\mathbf{84}_{FR}$ and $\mathbf{84}_{FL}$, based on the FR and FL normalized corner outputs, and a rear-side weighted average for the RR and RL brake actuators $\mathbf{84}_{RR}$ and $\mathbf{84}_{RL}$ based on the RR and RL normalized corner outputs. A longitudinal error percentage is concomitantly calculated at process block 215 as the absolute value of the mathematical difference between the front-side and rear-side weighted averages. Likewise, process block 211 may include calculating a full-system (overall) average for all four brake actuators $\mathbf{84}_{FR}$, $\mathbf{84}_{FL}$, $\mathbf{84}_{RR}$ and $\mathbf{84}_{RL}$ based on all of the FL, FR, RL and RR normalized corner outputs. A system error percentage may then be calculated at process block 217 as the absolute value of the mathematical difference between the full-system average and a target full-system average.

After determining one or more or all of the above-mentioned brake system deviations, the method 200 may execute LATERAL DEVIATION decision block 219, LONGITUDINAL DEVIATION decision block 221, and OVERALL SYSTEM DEVIATION decision block 223 to determine whether or not a brake actuator is faulty (e.g., inordinately degraded, defective, damaged, failed etc.). In each instance, a fault may be flagged when the calculated actuator error percentage is greater than the corresponding vehicle-calibrated fault deviation threshold. By way of non-limiting example, decision block 219 determines whether or not the lateral error percentage exceeds the vehicle-calibrated lateral deviation threshold. If it does not (Block 219=NO), method 200 may responsively loop back to data input block 203. Conversely, if the lateral error percentage does exceed the lateral deviation threshold (Block 219=YES), method 200 responsively executes LATERAL DEVIATION data storage block 225 and sets a flag in memory that there is likely a fault maturing in either a port-side brake actuator or a starboard-side brake actuator as indicated by the detected side-to-side deviation. Method 200 then executes LATERAL FAILURE decision block 231 to determine whether or not the detected side-to-sided deviation has risen to the level of a failed actuator (e.g., the detected lateral deviation exceeds a lateral failure threshold). If not (Block 231=NO), method 200 may responsively loop back to data input block 203. If a failed actuator has been detected (Block 231=YES), method 200 may responsively execute BUNDLE & ANALYZE predefined process block 237.

With continuing reference to FIG. 2, decision block 221 determines whether or not the longitudinal error percentage exceeds the vehicle-calibrated longitudinal deviation threshold. If it does not (Block 221=NO), method 200 may responsively loop back to data input block 203. Conversely, if the longitudinal error percentage does exceed the longitudinal deviation threshold (Block 221=YES), method 200 may responsively execute LONGITUDINAL DEVIATION data storage block 227 and sets a flag in memory that there is likely a fault maturing in either a fore or an aft corner actuator as indicated by the detected front-to-back deviation. Method 200 then executes LONGITUDINAL FAILURE decision block 233 to determine whether or not the detected front-to-back deviation has risen to the level of a failed actuator (e.g., the detected longitudinal deviation exceeds a longitudinal failure threshold). If not (Block 233=NO), method 200 may responsively loop back to data input block 203. If a failed actuator has been detected (Block 233=YES), method 200 may responsively execute predefined process block 237.

Decision block 223 determines whether or not the overall system error percentage exceeds a vehicle-calibrated overall system deviation threshold. If it does not (Block 223=NO), method 200 may responsively loop back to data input block 203. Conversely, if the system error percentage exceeds the system deviation threshold (Block 223=YES), method 200 may responsively execute SYSTEM DEVIATION data storage block 229 and sets a flag in memory that there is likely a fault maturing in some or all of the corner actuators as indicated by the detected system deviation. Method 200 then executes SYSTEM FAILURE decision block 235 to determine whether or not the detected system deviation has risen to the level of systemic actuator failures (e.g., the detected system deviation exceeds a system failure threshold). If not (Block 235=NO), method 200 may responsively loop back to data input block 203. If a failed actuator has been detected (Block 235=YES), method 200 may responsively execute predefined process block 237.

Upon detecting one or more faulty brake system actuators, method 200 may automatically execute BUNDLE & ANALYZE predefined process block 237 to aggregate, store, and analyze the results of the fault detection process and, using this information, attempt to determine a "worst offending" actuator. For example, if the lateral deviation analysis is showing degraded brake actuation on the port side of the vehicle 10 (e.g., causing an induced yaw) and the longitudinal deviation analysis is showing degraded brake actuation on the front axle of the vehicle 10 (e.g., causing a loss in deceleration), the method 200 may determine that the front-left brake actuator $\mathbf{84}_{FL}$, is the most degraded/defective of the four brake actuator $\mathbf{84}_{FL}$, $\mathbf{84}_{FR}$, $\mathbf{84}_{RL}$, $\mathbf{84}_{RR}$. The results of the analysis performed at predefined process block 237 may be stored to resident memory at STORE RESULTS data storage block 239. At BRAKE SYSTEM MODULATION process block 241, the method may adjust vehicle controls to maintain vehicle stability. For instance, the vehicle controller may automatically respond to determining an actuator error percentage exceeds its fault deviation threshold by commanding the decentralized brake system 82 to execute a vehicle-calibrated brake action to remediate the detected actuator fault.

Figure 3:
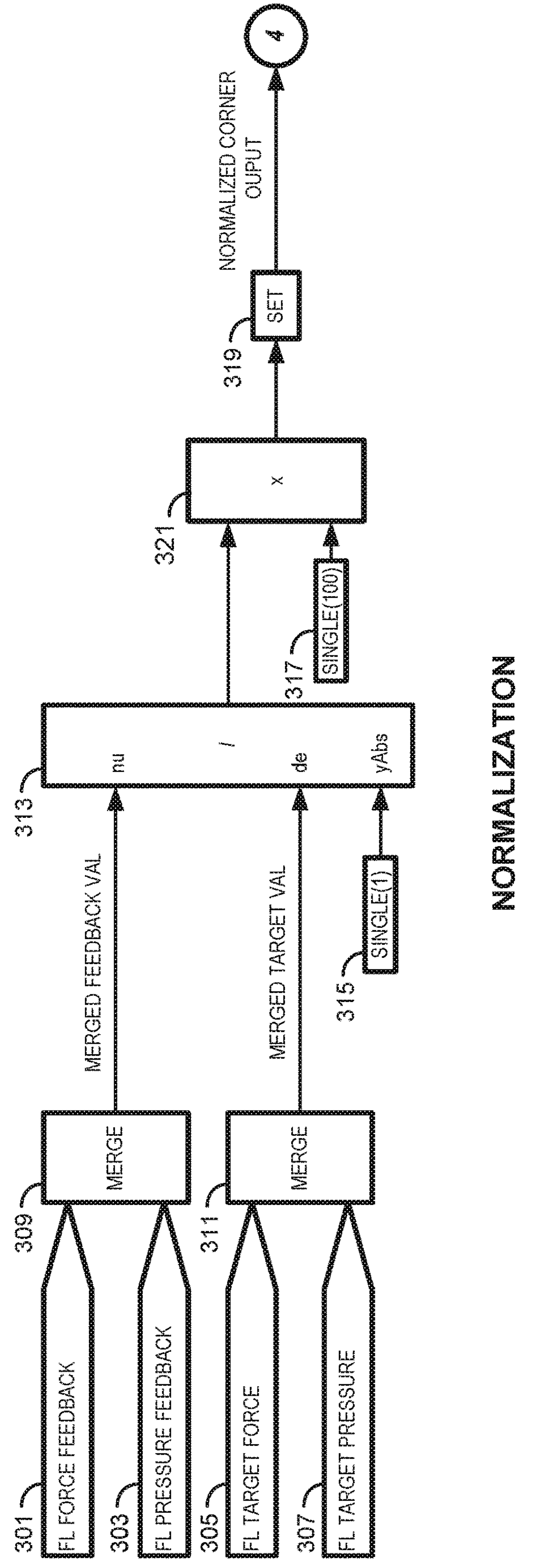
FIG. 3 is a flowchart illustrating a representative normalization protocol for normalizing brake actuator outputs of a decentralized vehicle brake system in accordance with aspects of the disclosed concepts.

Presented in FIG. 3 is a representative normalization protocol/method 300 that may be incorporated into the method 200 of FIG. 2 for normalizing the corner outputs of the brake actuators $\mathbf{84}_{FL}$, $\mathbf{84}_{FR}$, $\mathbf{84}_{RL}$, $\mathbf{84}_{RR}$ of the decentralized vehicle brake system 82. As indicated above, normalized corner outputs may be derived from the current values of the brake actuator target clamp forces, the current values of the achieved clamp forces, and the updated signals for the weight function and deviation threshold parameters. Normalization may be achieved, in part, by dividing the feedback response from the actuator against the target pressure or force for that actuator. Normalizing the corner outputs allows the algorithm to be independent of brake corner output units (e.g., Newtons or pound-force in electro-mechanical brake actuators or bar in electro-hydraulic brake actuators) by providing a unitless value. In practice, the method 300 of FIG. 3 may be run four times, once for each of the brake actuators $\mathbf{84}_{FL}$, $\mathbf{84}_{FR}$, $\mathbf{84}_{RL}$, $\mathbf{84}_{RR}$.

With continuing reference to FIG. 3, a force feedback value (e.g., for an electro-mechanical actuator) may be received by the method 300 for a designated corner (e.g., FL brake actuator $\mathbf{84}_{FL}$) at process block 301, whereas a pressure feedback value (e.g., for an electro-hydraulic actuator) may be received for the designated corner (e.g., FL brake actuator $\mathbf{84}_{FL}$) at process block 303. In tandem, a target force value may be received for the designated corner at process block 305 (e.g., if electro-mechanical), whereas a target pressure value may be received for the designated corner at process block 307 (e.g., if electro-hydraulic). Process block 309 of FIG. 3 merges the input values from blocks 301 and 303, whereas process block 311 merges the input values from blocks 305 and 307. A "merge" will pull in either a pressure feedback from a hydraulic actuator or a clamping force feedback from a mechanical actuator. If the designated corner is an electro-mechanical actuator, for example, the pressure feedback value may be set as "null" and the clamping force feedback value may be pushed through the merge function. For each brake actuator $\mathbf{84}_{FL}$, $\mathbf{84}_{FR}$, $\mathbf{84}_{RL}$, $\mathbf{84}_{RR}$, a merged feedback value is output by a first merge function in process block 309 by merging the force feedback value and the pressure feedback value based on the actuator type for that brake actuator. In the same vein, a merged target value is output for each brake actuator $\mathbf{84}_{FL}$, $\mathbf{84}_{FR}$, $\mathbf{84}_{RL}$, $\mathbf{84}_{RR}$ by a second merge function in process block 311 by merging the force target value and the pressure target value based on the actuator type for that brake actuator.

At process block 313, the merged feedback value output from process block 309 is mathematically divided by the merged target value output from process block 311. At process block 315, a single-precision, floating-point numeric data type, which may be in the nature of a "float" data type or "Single(1)", is passed through the normalization function when a zero target value is output as the merged target value to avoid a mathematical error in the normalization protocol 300. In other words, when a target value is zero, a brake request has not been received and a pressure/force feedback will therefore not be generated. As such, a fault deviation should not be detected and output of the normalization may be set to 100%. The value output from process block 313 is input into multiplication operator 321, where it is multiplied by a set value of one hundred (100) that is output from process block 317 ("single(100)") to make the number into a percentage. For instance, if the merged feedback value is 2000 psi and the merged target value is 2400 psi (2000/2400=0.8333×100=83.33), the normalized corner actuator output may be set to 83.3%. At process block 319, a set function assigns each normalized corner actuator output value a distinct variable name that may be called at a different function within the code.

Figure 4:
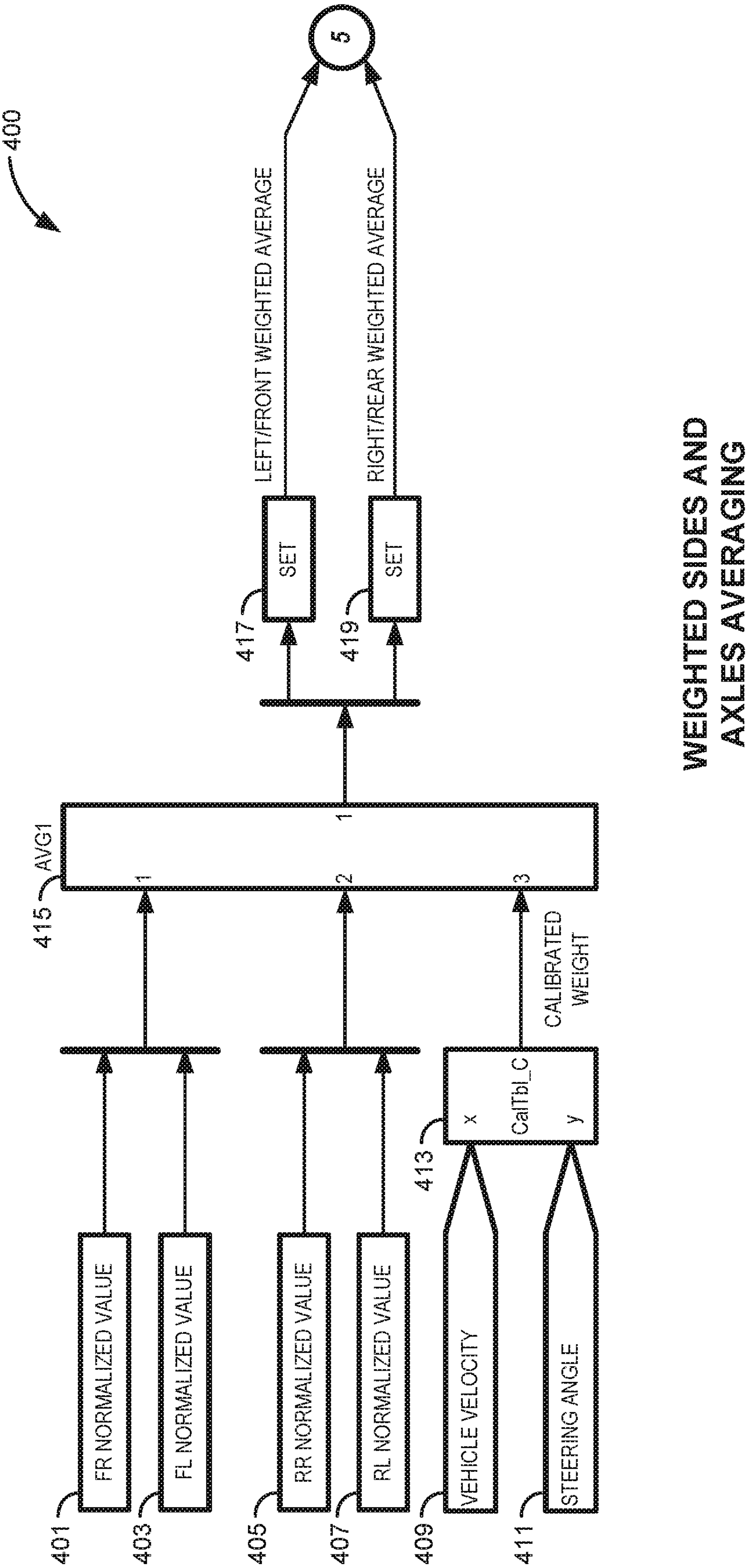
FIG. 4 is a flowchart illustrating a representative weighting and averaging protocol for deriving longitudinal and lateral weighted averages for a decentralized vehicle brake system in accordance with aspects of the disclosed concepts.

FIG. 4 is a representative weighting and averaging protocol/method 400 that may be incorporated into the method 200 of FIG. 2 for deriving longitudinal, lateral, and overall weighted averages for the brake actuators $\mathbf{84}_{FL}$, $\mathbf{84}_{FR}$, $\mathbf{84}_{RL}$, $\mathbf{84}_{RR}$ of the decentralized vehicle brake system 82. Using this protocol 400, a weighted average may be determined for each side of the vehicle (i.e., left-side corners and right-side corners), for each end of the vehicle (i.e., front axle corners and rear axle corners), and for the overall brake system (all four corners) using the four normalized signals output from the normalization protocol 300 of FIG. 3. As noted above, the weight function parameter may be retrieved from a calibratable lookup table, which may be calculated offline using real brake system data and simulation environments. Weighting and averaging may be done to account for varying contributions from the individual brake corners to the overall vehicle dynamics during various maneuvers.

At process block 401, 403, 405 and 407 of FIG. 4, method 400 receives as inputs the FR, FL, RR and RL normalized corner output values for the FR, FL, RR, RL brake actuators $\mathbf{84}_{FR}$, $\mathbf{84}_{FL}$, $\mathbf{84}_{RL}$, $\mathbf{84}_{RR}$, respectively. A real-time vehicle velocity value is received by the method 400 at process block 409 and a real-time vehicle steering angle value is received at process block 411; a calibration table (CalTbl_C) is called up at process block 413 to retrieve a vehicle-calibrated weight value that corresponds to the vehicle's current speed and steering angle. Advancing to process block 415, the method 400 takes the vehicle-calibrated weight value as a weighting factor and takes each corner's normalized value to determine ("AVG1") a left or front weighted average of the left side or front end of the vehicle 10, and a right or rear weighted average of the right side or back end of the vehicle 10. For instance, a right-side weighted average may be calculated as:

$$AverageNormOutput = \frac{W \times (NormFrontRightOutout + NormRearRightOutput)}{W + 1}$$

W=Weight function (vehicle velocity, vehicle steering angle)

A similar calculation may be conducted to derive a left-side weighted average, a front-end weighted average, and a rear-end weighted average. A full system comparison may be performed by taking an overall average using all four of the normalized corner outputs and using the same weighting factor as is used in the other functions. The overall system weighted average may be compared to the unit value (1) to account for all wheels normalized against their targets. At process blocks 417 and 419, a set function assigns each weighted average value a distinct variable name that may be called at a different function within the code.

Figure 5:
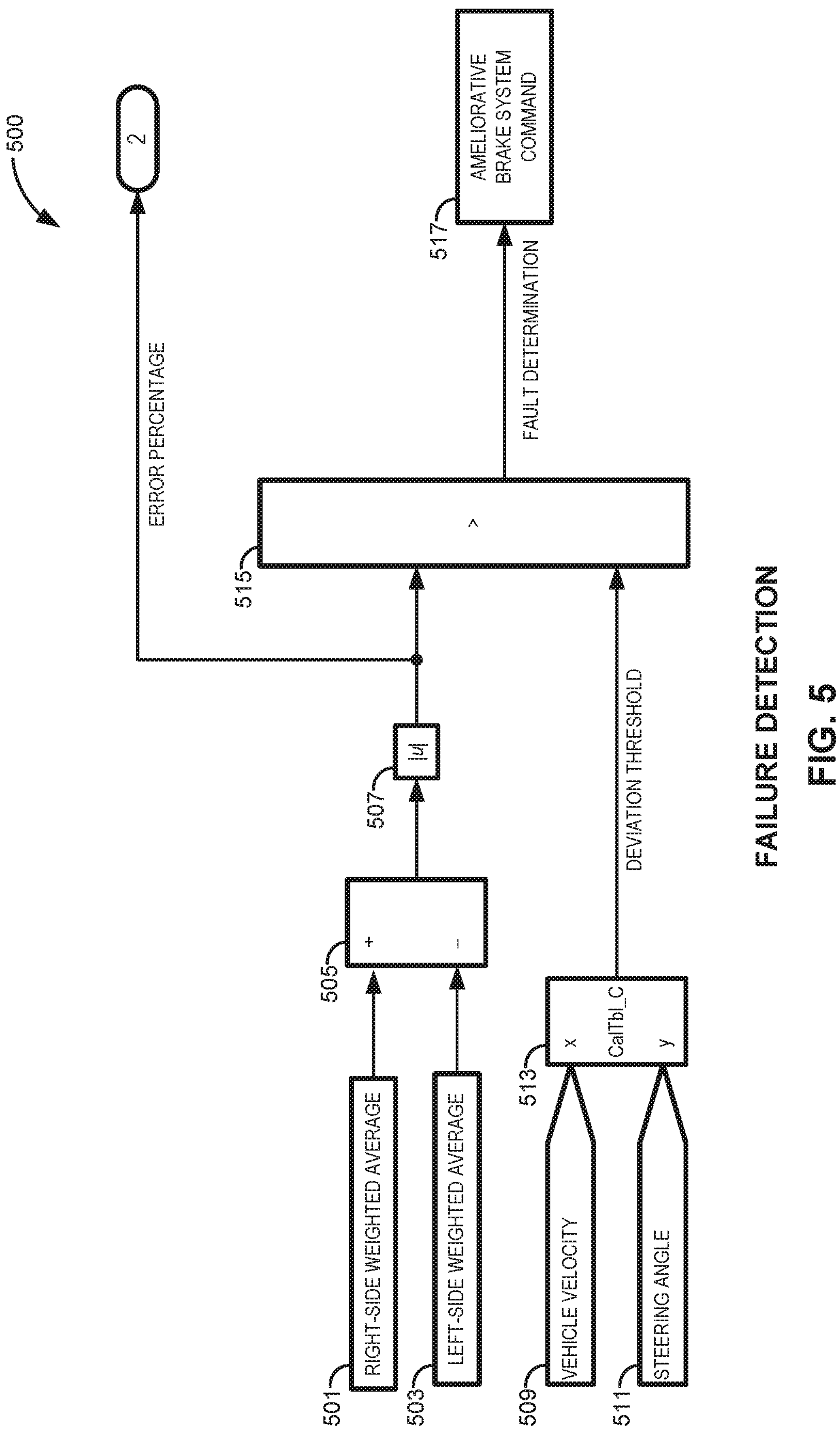
FIG. 5 is a flowchart illustrating a representative failure detection protocol for identifying faulty actuators in a decentralized vehicle brake system in accordance with aspects of the disclosed concepts.

FIG. 5 is a representative failure detection protocol/method 500 that may be incorporated into the method 200 of FIG. 2 for identifying faulty actuators in the brake actuators $\mathbf{84}_{FL}$, $\mathbf{84}_{FR}$, $\mathbf{84}_{RL}$, $\mathbf{84}_{RR}$ of the decentralized vehicle brake system 82. The Failure detection protocol 500 may determine if side-to-side, front-to-back, and overall system brake deviations surpass what may be considered a nominal healthy system and, thus, may lead to a vehicle hazard. Upon detection of an actuator fault, the faulty actuator(s) may be identified by providing a corresponding indication or indications to the control system through predefined interfaces to allow the system to modulate actuator output to degrade appropriately and, at the same time, adjust vehicle controls to maintain vehicle stability.

With continuing reference to FIG. 5, the right-side weighted average is received as a first input by the method 500 at process block 501 and the left-side weighted average is received as a second input by the method 500 at process block 503. Process block 505 calculates a mathematical difference ("Sum1") between the right-side and left-side weighted averages received at process blocks 501 and 503. At process block 507 an actuator error percentage is calculated as an absolute value of the mathematical difference between the weighted averages of the brake actuators from block 505. A real-time vehicle velocity value is received by the method 500 at process block 509 and a real-time vehicle steering angle value is received at process block 511; a calibration table (CalTbl_C) is called up at process block 513 to retrieve a vehicle-calibrated deviation threshold that corresponds to the vehicle's current speed and steering angle. At process block 515, an actuator fault is detected when the actuator error percentage is greater than the vehicle-calibrated fault deviation threshold. If a fault determination is made, method 500 may responsively output an ameliorative brake system command at process block 517.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol, or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating a motor vehicle having a vehicle body, multiple road wheels attached to the vehicle body, and a decentralized brake system with multiple brake actuators each operable to decelerate a respective one of the road wheels, the multiple brake actuators including front-left (FL), front-right (FR), rear-left (RL), and rear-right (RR) brake actuators, the method comprising:

receiving, from each of multiple sensors operatively attached to the brake actuators, sensor data indicative of a measured actuator output of a respective one of the brake actuators, the sensor data including a respective force feedback value and a respective pressure feedback value for each of the FL, FR, RL and RR brake actuators;

calculating, via a vehicle controller for each of the brake actuators, a normalized corner output using the measured actuator output and a respective commanded target actuator output for the brake actuator, the normalized corner outputs including FL, FR, RL and RR normalized corner outputs for the FL, FR, RL and RR brake actuators, respectively, and the commanded target actuator outputs including a respective target force value and a respective target pressure value for each of the FL, FR, RL and RR brake actuators;

calculating, via the vehicle controller for each of the brake actuators, a weighted average using the normalized corner output of the brake actuator and a vehicle-calibrated weight value determined from a current vehicle speed and/or a current vehicle steering angle, wherein calculating the weighted average includes calculating a full-system average for all of the FL, FR, RL and RR brake actuators based on all of the FL, FR, RL and RR normalized corner outputs;

calculating, via the vehicle controller, an actuator error percentage as an absolute value of a mathematical difference between the weighted averages of the brake actuators;

detecting, via the vehicle controller, an actuator fault when the actuator error percentage is greater than a vehicle-calibrated fault deviation threshold determined from the current vehicle speed and/or the current vehicle steering angle; and commanding, via the vehicle controller responsive to determining the actuator error percentage is greater than the vehicle-calibrated fault deviation threshold, operation of the decentralized brake system, a vehicle steering system, and/or a vehicle powertrain system to execute a vehicle-calibrated action to remediate the actuator fault.

2. The method of claim 1, wherein calculating the normalized corner output further includes:

determining, via the vehicle controller, an actuator type for each of the FL, FR, RL and RR brake actuators; and determining, via the vehicle controller for each of the FL, FR, RL and RR brake actuators, a merged feedback value by merging the force feedback value and the pressure feedback value based on the actuator type for the brake actuator.

3. The method of claim 1, wherein calculating the weighted average includes:

calculating a right-side weighted average for the FR and RR brake actuators based on the FR and RR normalized corner outputs; and calculating a left-side weighted average for the FL and RL brake actuators based on the FL and RL normalized corner outputs.

4. The method of claim 3, wherein the actuator error percentage includes a lateral error percentage calculated as the absolute value of the mathematical difference between the right-side weighted average and the left-side weighted average, and wherein detecting the actuator fault includes the lateral error percentage exceeding a vehicle-calibrated lateral deviation threshold.

5. The method of claim 1, wherein calculating the weighted average includes:

calculating a front-side weighted average for the FR and FL brake actuators based on the FR and FL normalized corner outputs; and calculating a rear-side weighted average for the RR and RL brake actuators based on the RR and RL normalized corner outputs.

6. The method of claim 5, wherein the actuator error percentage includes a longitudinal error percentage calculated as the absolute value of the mathematical difference between the front-side weighted average and the rear-side weighted average, and wherein detecting the actuator fault includes the longitudinal error percentage exceeding a vehicle-calibrated longitudinal deviation threshold.

7. The method of claim 1, wherein the actuator error percentage includes a system error percentage calculated as the absolute value of the mathematical difference between the full-system average and a target full-system average, and wherein detecting the actuator fault includes the system error percentage exceeding a vehicle-calibrated overall deviation threshold.

8. The method of claim 1, further comprising determining, via the vehicle controller responsive to the detected actuator fault, which of the brake actuators is a worst offending actuator based on the calculated normalized corner outputs and the calculated weighted averages.

9. The method of claim 1, further comprising:

retrieving, via the vehicle controller from a first calibration lookup table, the vehicle-calibrated weight value;

retrieving, via the vehicle controller from a second calibration lookup table, the vehicle-calibrated fault deviation threshold; and updating a weight and threshold data set to include the vehicle-calibrated weight value and the vehicle-calibrated fault deviation threshold.

10. The method of claim 1, further comprising:

receiving, via the vehicle controller, the current vehicle speed, the current vehicle steering angle, and the commanded target actuator outputs for the brake actuators; and updating a signal data set within a defined time domain to include the current vehicle speed, the current vehicle steering angle, the commanded target actuator outputs, and the measured actuator outputs.

11. The method of claim 1, further comprising:

receiving, via the vehicle controller prior to receipt of the sensor data, a break request to activate the decentralized brake system; and activating, via the vehicle controller responsive to receipt of the brake request, the brake actuators of the decentralized brake system to decelerate the road wheels of the motor vehicle.

12. A non-transient, computer-readable medium (CRM) storing instructions executable by a vehicle controller of a motor vehicle, the motor vehicle including multiple road wheels and a decentralized brake system with multiple brake actuators each operable to decelerate a respective one of the road wheels, the multiple brake actuators including front-left (FL), front-right (FR), rear-left (RL), and rear-right (RR) brake actuators, the instructions, when executed, causing the vehicle controller to perform operations comprising:

receiving, from each of multiple sensors operatively attached to the brake actuators, sensor data indicative of a measured actuator output of a respective one of the brake actuators, the sensor data including a respective force feedback value and a respective pressure feedback value for each of the FL, FR, RL and RR brake actuators;

calculating, for each of the brake actuators, a normalized corner output using the measured actuator output and a respective commanded target actuator output for the brake actuator, the normalized corner outputs including FL, FR, RL and RR normalized corner outputs for the FL, FR, RL and RR brake actuators, respectively, and the commanded target actuator outputs including a respective target force value and a respective target pressure value for each of the FL, FR, RL and RR brake actuators;

determining a vehicle-calibrated weight value from a current vehicle speed and/or a current vehicle steering angle;

calculating, for each of the brake actuators, a weighted average using the normalized corner output of the brake actuator and the vehicle-calibrated weight value, wherein calculating the weighted average includes calculating a full-system average for the FL, FR, RL and RR brake actuators based on the FL, FR, RL and RR normalized corner outputs;

calculating an actuator error percentage as an absolute value of a mathematical difference between the weighted averages of the brake actuators;

determining a vehicle-calibrated fault deviation threshold from the current vehicle speed and/or the current vehicle steering angle;

detecting an actuator fault when the actuator error percentage is greater than the vehicle-calibrated fault deviation threshold; and commanding, responsive to determining the actuator error percentage is greater than the vehicle-calibrated fault deviation threshold, operation of the decentralized brake system to execute a vehicle-calibrated brake action to remediate the actuator fault.

13. The non-transient CRM of claim 12, wherein the instructions further cause the vehicle controller to perform operations comprising:

receiving, prior to receipt of the sensor data, a break request to activate the decentralized brake system; and activating, responsive to receipt of the brake request, the brake actuators of the decentralized brake system to decelerate the road wheels of the motor vehicle.

14. A motor vehicle, comprising:

a vehicle body;

a plurality of road wheels attached to the vehicle body;

a prime mover attached to the vehicle body and configured to drive one or more of the road wheels to thereby propel the motor vehicle;

a decentralized brake system attached to the vehicle body and including a plurality of brake actuators each independently operable to decelerate a respective one of the road wheels to thereby slow or stop the motor vehicle, the brake actuators including front-left (FL), front-right (FR), rear-left (RL), and rear-right (RR) brake actuators;

a plurality of brake sensors each operatively attached to a respective one of the brake actuators; and a vehicle controller communicatively connected to the decentralized brake system and the brake sensors, the vehicle controller being programmed to:

receive a break request to activate the decentralized brake system;

responsive to receiving the brake request, activate the brake actuators of the decentralized brake system to decelerate the road wheels of the motor vehicle;

receive, from each of the brake sensors, sensor data indicative of a measured actuator output of a respective one of the brake actuators, the sensor data including a respective force feedback value and a respective pressure feedback value for each of the FL, FR, RL and RR brake actuators;

calculate, for each of the brake actuators, a normalized corner output using the measured actuator output and a respective commanded target actuator output for the brake actuator, the normalized corner outputs including FL, FR, RL and RR normalized corner outputs for the FL, FR, RL and RR brake actuators, respectively, and the commanded target actuator outputs including a respective target force value and a respective target pressure value for each of the FL, FR, RL and RR brake actuators;

determine a vehicle-calibrated weight value from a current vehicle speed and/or a current vehicle steering angle calculate, for each of the brake actuators, a weighted average using the normalized corner output of the brake actuator and the vehicle-calibrated weight value, wherein calculating the weighted average includes calculating a full-system average for the FL, FR, RL and RR brake actuators based on the FL, FR, RL and RR normalized corner outputs;

calculate an actuator error percentage as an absolute value of a mathematical difference between the weighted averages of the brake actuators;

determine a vehicle-calibrated fault deviation threshold from the current vehicle speed and/or the current vehicle steering angle;

detect an actuator fault when the actuator error percentage is greater than the vehicle-calibrated fault deviation threshold; and responsive to determining the actuator error percentage is greater than the vehicle-calibrated fault deviation threshold, command operation of the decentralized brake system, a vehicle steering system, and/or a vehicle powertrain system to execute a vehicle-calibrated action to remediate the actuator fault.

15. The motor vehicle of claim 14, wherein:

calculating the weighted average includes calculating a right-side weighted average for the FR and RR brake actuators based on the FR and RR normalized corner outputs, and calculating a left-side weighted average for the FL and RL brake actuators based on the FL and RL normalized corner outputs, the actuator error percentage includes a lateral error percentage calculated as the absolute value of the mathematical difference between the right-side weighted average and the left-side weighted average, and detecting the actuator fault includes the lateral error percentage exceeding a vehicle-calibrated lateral deviation threshold.

16. The motor vehicle of claim 14, wherein:

calculating the weighted average includes calculating a front-side weighted average for the FR and FL brake actuators based on the FR and FL normalized corner outputs; and calculating a rear-side weighted average for the RR and RL brake actuators based on the RR and RL normalized corner outputs, the actuator error percentage includes a longitudinal error percentage calculated as the absolute value of the mathematical difference between the front-side weighted average and the rear-side weighted average, and detecting the actuator fault includes the longitudinal error percentage exceeding a vehicle-calibrated longitudinal deviation threshold.

17. The motor vehicle of claim 14, wherein:
the actuator error percentage includes a system error percentage calculated as the absolute value of the mathematical difference between the full-system average and a target full-system average, and
detecting the actuator fault includes the lateral error percentage exceeding a vehicle-calibrated overall deviation threshold.

18. The motor vehicle of claim 14, wherein the vehicle controller is further programmed to determine which of the brake actuators is a worst offending actuator based on the calculated normalized corner outputs and the calculated weighted averages.

19. The motor vehicle of claim 14, wherein the vehicle controller is further programmed to:
retrieve, from a first calibration lookup table, the vehicle-calibrated weight value;
retrieve, from a second calibration lookup table, the vehicle-calibrated fault deviation threshold; and
update a weight and threshold data set to include the vehicle-calibrated weight value and the vehicle-calibrated fault deviation threshold.

20. The motor vehicle of claim 14, wherein calculating the normalized corner output further includes:
determining an actuator type for each of the FL, FR, RL and RR brake actuators; and
determining, for each of the FL, FR, RL and RR brake actuators, a merged feedback value by merging the force feedback value and the pressure feedback value based on the actuator type for the brake actuator.

* * * * *